(12) United States Patent  
Youn

(10) Patent No.: US 9,001,421 B2  
(45) Date of Patent: Apr. 7, 2015

(54) DEVICE FOR ADJUSTING OPTICAL MAGNIFICATION OF MICROSCOPE

(71) Applicant: Huvitz Co., Ltd., Gunpo-Si (KR)

(72) Inventor: Se-Chang Youn, Gunpo-si (KR)

(73) Assignee: Huvitz Co., Ltd., Gunposi (KR)

( * ) Notice: Subject to any disclaimer, the term of this patent is extended or adjusted under 35 U.S.C. 154(b) by 246 days.

(21) Appl. No.: 13/679,205

(22) Filed: Nov. 16, 2012

(65) Prior Publication Data

US 2013/0265638 A1    Oct. 10, 2013

(30) Foreign Application Priority Data

Apr. 5, 2012   (KR) .................. 10-2012-0035381

(51) Int. Cl.
    *G02B 21/02*         (2006.01)
(52) U.S. Cl.
    CPC .................... *G02B 21/025* (2013.01)
(58) Field of Classification Search
    USPC .................................................. 359/380, 432
    See application file for complete search history.

(56) References Cited

U.S. PATENT DOCUMENTS

| 4,157,859 A | * | 6/1979 | Terry ........................... 359/375 |
| 5,069,527 A | * | 12/1991 | Johnston et al. ............. 359/823 |
| 5,907,433 A | * | 5/1999 | Voigt et al. .................... 359/432 |
| 6,476,979 B1 | * | 11/2002 | Schaack ........................ 359/738 |
| 6,804,049 B2 | * | 10/2004 | Ogino et al. .................. 359/368 |
| 8,379,303 B2 | * | 2/2013 | Wakamatsu et al. ......... 359/380 |
| 2011/0286091 A1 | | 11/2011 | Wakamatsu |

FOREIGN PATENT DOCUMENTS

| DE | 4213312 A1 | * | 10/1993 | ............. G02B 21/24 |
| JP | 61080213 A | * | 4/1986 | ............. G02B 15/00 |
| JP | 2012-018812 | | 1/2012 | |
| WO | 2010/038846 | | 4/2010 | |

* cited by examiner

*Primary Examiner* — Frank Font

(74) *Attorney, Agent, or Firm* — Lexyoume IP Meister, PLLC

(57) ABSTRACT

The present invention relates to a device for adjusting an optical magnification of a microscope, the device including: a magnification adjuster adapted to change the optical magnification of the microscope in accordance with the relative rotation position with respect to a tube unit; a membrane potentiometer positioned on the rotating passage of the magnification adjuster to output an electrical signal corresponding to the contacted position of the magnification adjuster therewith; and a controller adapted to receive the electrical signal outputted from the membrane potentiometer to output the optical magnification corresponding to the rotated position of the magnification adjuster.

5 Claims, 3 Drawing Sheets

DEVICE FOR ADJUSTING OPTICAL MAGNIFICATION OF MICROSCOPE

BACKGROUND OF THE INVENTION

1. Field of the Invention

This application claims the priority benefit of Korean Patent Application No. 10-2012-0035381 filed on Apr. 5, 2012. All disclosure of the Korean Patent application is incorporated herein by reference.

The present invention relates to a device for adjusting an optical magnification of a microscope, and more particularly, to a device for adjusting an optical magnification of a microscope that is capable of rotating a magnification adjuster mounted on a tube unit of the microscope, thereby linearly increasing or decreasing the optical magnification of the microscope.

2. Background of the Related Art

Generally, observing equipment like a digital microscope, which is adapted to enlarge and observe a sample or object, is provided to allow the magnification of the sample or object to be adjusted to an observer's desired magnification as well as to permit the magnification used for current observation or photographing to be checked by the observer.

FIG. 1 shows a configuration of a general digital microscope system. As shown in FIG. 1, the typical digital microscope system includes a base 10 on which an object is located, a stand 12 mounted on one side of the base 10, a tube unit 20 supported by the stand 12, a lens unit 22 mounted on the object side end of the tube unit 20 to produce the enlarged image of the object, a camera 24 mounted on the observer side end of the tube unit 20 to detect the enlarged image of the object, and a magnification adjuster 26 mounted along the tube unit 20 to adjust the magnification of the object. If necessary, the camera is connected to a controller 14 having an image display 16 like an LCD mounted thereon, and thus, the operation of the camera 24 is controlled by means of the controller 14 or the detected image of the object from the camera 24 is transmitted to the controller 14, thereby displaying the image of the object on the image display 16. Like this, the tube unit 20 of the typical microscope has the zoom optical magnification adjuster 26 mounted therealong to adjust the magnification of the object, and if the magnification adjuster 26 is rotated by the observer, the magnification of the object is increased or decreased.

According to the typical microscope as shown in FIG. 1, the position of the magnification adjuster 26 is detected to check the magnification used currently. For example, the magnification adjuster 26 has a plurality of photo interrupter sensors (not shown) mounted thereon, and if it is rotated and changed in position, the position thereof is detected by the specific photo interrupter sensor mounted thereon, so that the optical magnification corresponding to the photo interrupter sensor detecting the position of the magnification adjuster 26 is provided to the observer. In case of the typical magnification adjuster 26, however, only the magnifications corresponding to the number of photo interrupter sensors mounted thereon are checked, and if the magnification adjuster 26 is located at a position where no photo interrupter sensors are mounted, the magnification cannot be accurately obtained.

SUMMARY OF THE INVENTION

Accordingly, the present invention has been made in view of the above-mentioned problems occurring in the prior art, and it is an object of the present invention to provide a device for adjusting an optical magnification of a microscope that is capable of continuously detecting the linear variation values of the optical magnifications of the microscope.

It is another object of the present invention to provide a device for adjusting an optical magnification of a microscope that is capable of continuously and accurately detecting the position of a magnification adjuster.

It is still another object of the present invention to provide a device for adjusting an optical magnification of a microscope that is simple in a mechanical structure and is capable of being efficiently mounted on the microscope.

To accomplish the above objects, according to the present invention, there is provided a device for adjusting an optical magnification of a microscope, the device comprising: a magnification adjuster adapted to change the optical magnification of the microscope in accordance with the relative rotation position with respect to a tube unit; a membrane potentiometer positioned on the rotating passage of the magnification adjuster to output an electrical signal corresponding to the contacted position of the magnification adjuster therewith; and a controller adapted to receive the electrical signal outputted from the membrane potentiometer to output the optical magnification corresponding to the rotated position of the magnification adjuster.

The device for adjusting an optical magnification of a microscope according to the present invention is capable of continuously and accurately detecting the position of a magnification adjuster, and also is simple in a mechanical structure and is capable of being efficiently mounted on the microscope.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a device for adjusting an optical magnification of a microscope according to the preferred embodiments of the present invention will be in detail given with reference to the attached drawings.

Figure 1:
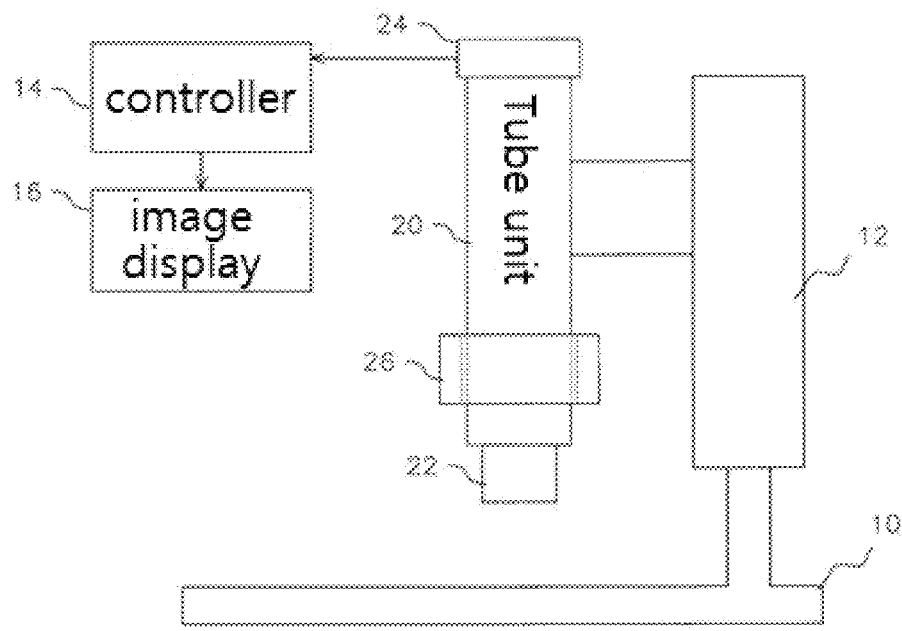
FIG. 1 shows a configuration of a general digital microscope system.
Figure 2:
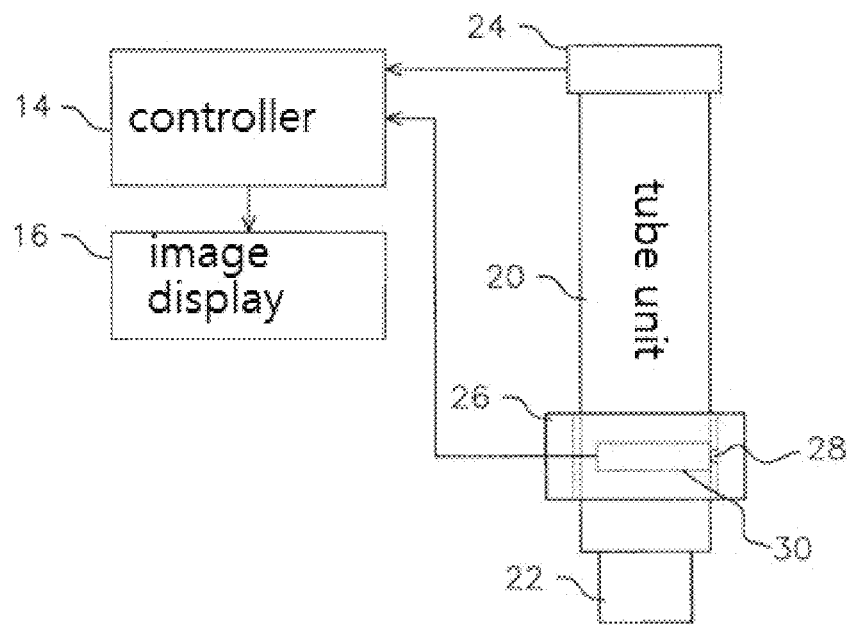
FIG. 2 shows a device for adjusting an optical magnification of a microscope according to one embodiment of the present invention.

FIG. 2 shows a device for adjusting an optical magnification of a microscope according to one embodiment of the present invention. As shown in FIG. 2, a device for adjusting an optical magnification of a microscope according to one embodiment of the present invention largely includes a magnification adjuster 26, a membrane potentiometer 30, and a controller 14. The magnification adjuster 26 is typical means adapted to move a lens unit 22 upwardly and downwardly in accordance with the relative rotation position (that is, a degree of rotation) with respect to a tube unit 20 to change the optical magnification of the microscope. For example, if the magnification adjuster 26 is rotated clockwisely, the lens unit 22 is moved downwardly to increase the optical magnification of the microscope, and contrarily, if it is rotated counterclockwisely, the lens unit 22 is moved upwardly to decrease the optical magnification of the microscope. Only if the magnification adjuster 26 is rotated or moved to change the optical magnification, it does not have any specific limitation in its configuration, and desirably, it has a donut-like shape capable of rotatably fitting the tube unit 20 thereinto. The upward and downward movement mechanism of the lens unit 22 in accordance with the rotation of the magnification adjuster 26 can be formed through generally power transmission mechanism using gears, screws, belts and the like.

Figure 3:
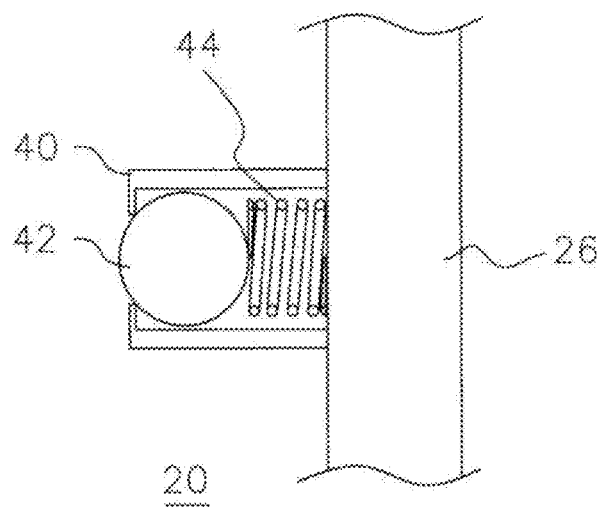
FIG. 3 shows a sectional view of a contact pin adopted in the device according to one embodiment of the present invention.

Desirably, the magnification adjuster 26 has a contact pin 28 formed protrudedly from the inner surface thereof so as to easily recognize or sense the position thereof. FIG. 3 shows a sectional view of a contact pin adopted in the device according to one embodiment of the present invention. As shown in FIG. 3, the contact pin 28 includes a locking protrusion 40 protruded from the inner surface of the magnification adjuster 26, a contact portion 42 protruded partially from the locking protrusion 40, and an elastic spring 44 mounted between the inner surface of the magnification adjuster 26 and the contact portion 42 to allow the contact portion 42 to be elastically contacted with the membrane potentiometer 30, that is, in the opposite direction to the inner surface of the magnification adjuster 26. For example, the contact portion 42 is formed of a metal ball. Like this, if the contact portion 42 is elastically contacted with the membrane potentiometer 30, it is moved (that is, rolled) in the state of being brought into close contact with the membrane potentiometer 30, thereby preventing the membrane potentiometer 30 from being damaged or broken.

Referring again to FIG. 2, the membrane potentiometer is positioned on the rotating passage of the magnification adjuster 26 to detect the position of the rotated magnification adjuster 26. If the magnification adjuster 26 is rotated around the tube unit 20, the contact pin 28 formed on the magnification adjuster 26 is contacted with the sensing surface of the membrane potentiometer 30 and is slidingly moved thereto, so that the electrical signal corresponding to the contacted position of the contact pin 28 with the membrane potentiometer 30 is outputted from the membrane potentiometer 30. According to the present invention as shown in FIG. 2, the membrane potentiometer 30 is fixedly attached to the surface of the tube unit 20, while being positioned between the tube unit 20 and the magnification adjuster 26. Accordingly, if the magnification adjuster 26 is rotated clockwisely or counterclockwisely, the contacted position (sensing portion) between the membrane potentiometer 30 and the contact pin 28 is moved to vary the output value from the membrane potentiometer 30.

Figure 4:
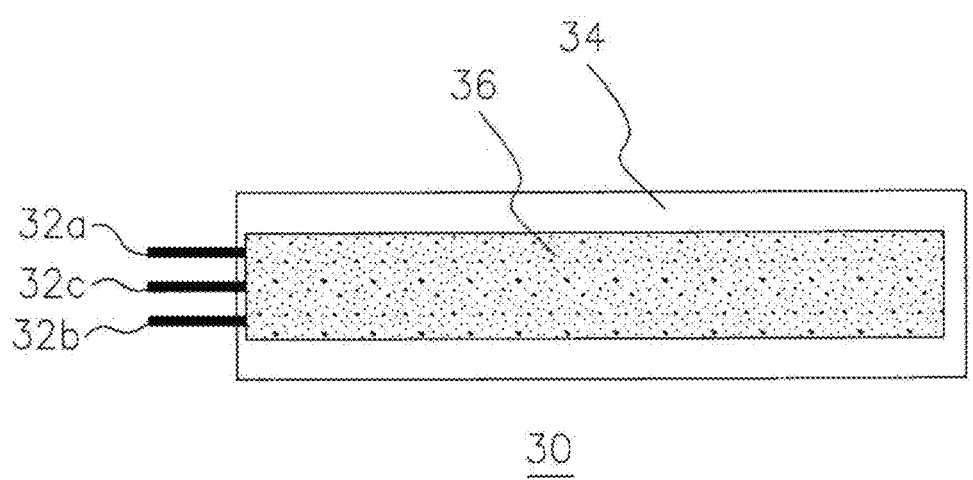
FIG. 4 shows an example of a membrane potentiometer adopted in the device according to one embodiment of the present invention.
Figure 5:
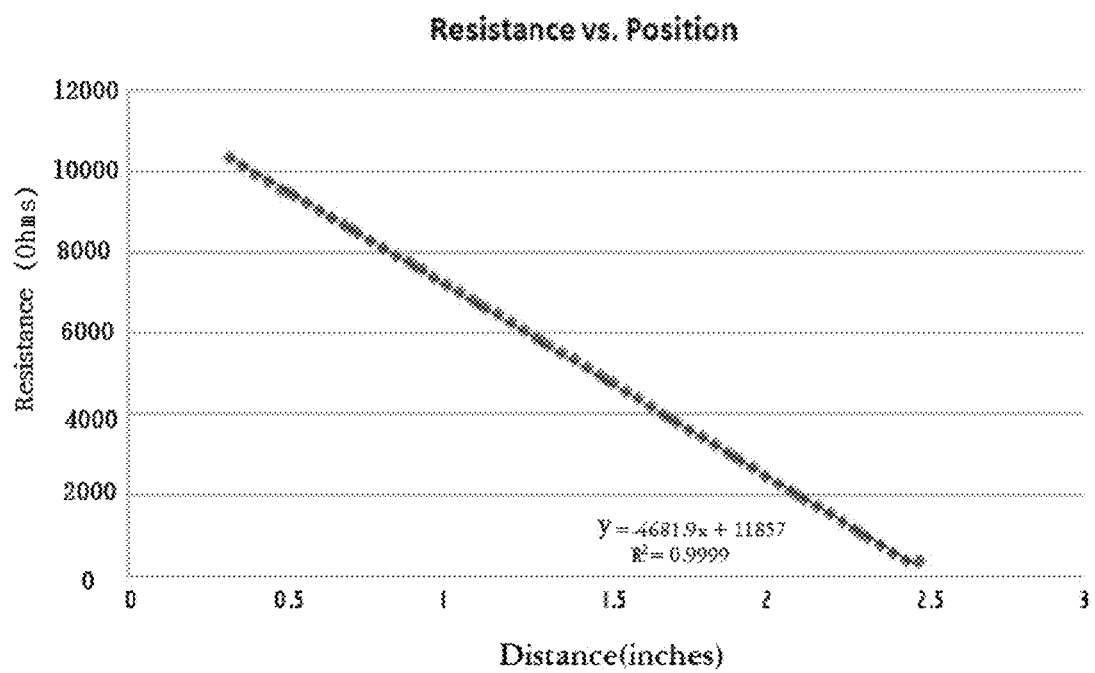
FIG. 5 shows a graph on the variations of the output resistance values of the membrane potentiometer according to the contact positions of the contact pin in the device according to one embodiment of the present invention.

FIG. 4 shows an example of a membrane potentiometer adopted in the device according to one embodiment of the present invention. As shown in FIG. 4, the membrane potentiometer 30 adopted in one embodiment of the present invention is a typical unit capable of being flexibly attached to the surface of the tube unit 20, while being positioned between the tube unit 20 and the magnification adjuster 26, and also capable of outputting the electrical signal corresponding to the contacted position of the contact pin 28 therewith. For example, the membrane potentiometer 30 is composed of an elongated thin film-like support body 34, a coated portion 36 with a conductive material such as carbon black, graphite powder, metal powder and the like, and potentiometer power input ports 32a and 32b and a detection position output port 32c formed on the end of the coated portion 36. Power (e.g., voltage of +5V) is applied through the potentiometer power input ports 32a and 32b (power + and −) to the membrane potentiometer 30, and if a given position of the coated portion 36 is pressed, the resistance of the coated portion 36 and the electric potential outputted from the detection position output port 32c are varied in accordance with the pressed position of the coated portion 36. The membrane potentiometer 30 is a variable resistor that varies the resistance value (e.g., 0 to 10 kΩ) in accordance with the contacted position (that is, the pressed position) between the coated portion 36 and the contact pin 28, so that the output values of the membrane potentiometer 30 are linearly varied in a range from a given minimum value to a given maximum value in accordance with the positions of the contact pin 28. FIG. 5 shows a graph on the variations of the output resistance values of the membrane potentiometer in accordance with the contact positions of the contact pin. That is, the resistance value of the membrane potentiometer 30 and the pressed position of the coated portion 36 can be detected from the output potential outputted from the detection position output port 32c. Accordingly, the rotated position of the magnification adjuster 26 is detected and the optical magnification of the tube unit 20 is quantitatively calculated through the membrane potentiometer 30.

Referring again to FIG. 2, the controller 14 receives the electrical signal outputted from the membrane potentiometer 30 to output the optical magnification corresponding to the rotated position of the magnification adjuster 26. In more detail, the controller 14 obtains the electrical signal corresponding to the contacted position of the contact pin 28 with the membrane potentiometer 30 and calculates and outputs the quantitative optical magnification therefrom. The controller 14 may be a microprocessor controlling the membrane potentiometer 30 and may have an analog-digital converter ADC that supplies given power to the membrane potentiometer 30 and receives the analog type electrical signal outputted from the membrane potentiometer 30 to convert the electrical signal into a digital signal.

The tube unit 20 is typical means that adjusts the upward and downward positions of the lens unit 22 or the zoom lens (not shown) disposed at the inside thereof to change (increase or decrease) the optical magnification of the microscope. Generally, the multiplication of the optical magnification of the zoom lens mounted inside the tube unit 20 and the optical magnification of the lens mounted on the lens unit 22 becomes the whole optical magnification of the microscope. Further, a camera 24 is typical means that is mounted on the observer side end of the tube unit 20 to detect the image of the object enlarged in the tube unit 20. An image display 16 attached to the controller 14 is means that displays the image of the object detected through the camera 24 or displays the optical magnification calculated through the controller 14, which is formed of a typical liquid crystal display LCD.

Figure 6:
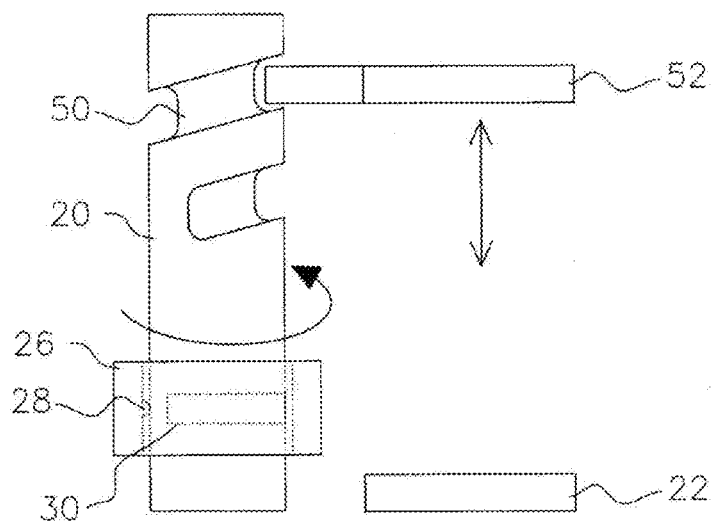
FIG. 6 shows a device for adjusting an optical magnification of a microscope according to another embodiment of the present invention.

FIG. 6 shows a device for adjusting an optical magnification of a microscope according to another embodiment of the present invention. The device for adjusting an optical magnification of a microscope as shown in FIG. 6 is different from that as shown in FIG. 2, in that the magnification adjuster 26 and the contact pin 28 formed protrudedly from the magnification adjuster 26 are fixed, and contrarily, the tube unit 20 and the membrane potentiometer 30 attached to the tube unit 20 are rotated. That is, as shown in FIG. 6, the membrane potentiometer 30 is mounted around one end of the tube unit 20, and a tube unit lens conveying screw groove 50 is formed around the other end of the tube unit 20, so that the tube unit 20 is just rotated clockwisely or counterclockwisely, without having any upward and downward movements. A tube unit lens 52 is moved only in upward and downward directions, and one end of the tube unit lens 52 is fitted into the tube unit lens conveying screw groove 50. If the tube unit 20 is rotated, accordingly, the tube unit lens 52 fitted into the tube unit lens conveying screw groove 50 is moved upwardly and downwardly along the tube unit lens conveying screw groove 50. As a result, the distance between the tube unit lens and the lens unit 22 is varied to change the optical magnification, and the position of the contact pin 28 is detected through the membrane potentiometer 30 to calculate the optical magnification.

As set forth in the foregoing, the device for adjusting an optical magnification of a microscope is capable of continuously and in real time detecting the linear variation of the optical magnification, so that when compared with the conventional devices where the optical magnification is detected non-linearly (through the step-by-step variation), the device of the present invention can detect the magnification of the object to be observed in more accurate and rapid manners. The device according to the present invention is applied to microscopes, especially digital microscopes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A device for adjusting an optical magnification of a microscope, the device comprising:

a magnification adjuster adapted to change the optical magnification of the microscope in accordance a degree of rotation of the magnification adjuster with respect to a tube unit;

a membrane potentiometer positioned on a rotating passage of the magnification adjuster to output an electrical signal corresponding to a contact position of the membrane potentiometer which contacts with the magnification adjuster; and a controller adapted to receive the electrical signal outputted from the membrane potentiometer to output the optical magnification corresponding to the degree of rotation of the magnification adjuster.

2. The device for adjusting an optical magnification of a microscope according to claim 1, wherein the magnification adjuster has a contact pin formed protrudedly from an inner surface of the magnification adjuster so as to sense a position of the contact in which is contacted with the membrane potentiometer.

3. The device for adjusting an optical magnification of a microscope according to claim 2, wherein the contact pin comprises a locking protrusion protruded from the inner surface of the magnification adjuster, a contact portion protruded partially from the locking protrusion, and an elastic spring mounted between the inner surface of the magnification adjuster and the contact portion to allow the contact portion to be elastically contacted with the membrane potentiometer.

4. The device for adjusting an optical magnification of a microscope according to claim 1, wherein the membrane potentiometer is fixedly attached to a surface of the tube unit, while being positioned between the tube unit and the magnification adjuster, and wherein the membrane potentiometer comprises an elongated thin film-like support body, a coating portion coated with a conductive material and formed on the support body, and potentiometer power input ports and a detection position output port which are formed on an end of the coating portion.

5. The device for adjusting an optical magnification of a microscope according to claim 1, wherein the membrane potentiometer is mounted around one end of the tube unit, and a tube unit lens conveying screw groove is formed around the other end of the tube unit, so that the tube unit is rotated clockwisely or counterclockwisely, without having any upward and downward movements, while the tube unit lens is being moved in upward and downward directions, and wherein one end of the tube unit lens is fitted into the tube unit lens conveying screw groove, so that if the tube unit is rotated, the tube unit lens fitted into the tube unit lens conveying screw groove is moved upwardly and downwardly along the tube unit lens conveying screw groove.

* * * * *